(12) United States Patent
Schuba et al.

(10) Patent No.: US 6,724,733 B1
(45) Date of Patent: Apr. 20, 2004

(54) METHOD AND APPARATUS FOR DETERMINING APPROXIMATE NETWORK DISTANCES USING REFERENCE LOCATIONS

(75) Inventors: Christoph Schuba, Mountain View, CA (US); Raphael Rom, Palo Alto, CA (US); Israel Cidon, Cupertino, CA (US); Amit Gupta, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/432,506

(22) Filed: Nov. 2, 1999

(51) Int. Cl.[7] .............................................. G01R 31/08
(52) U.S. Cl. ...................................... 370/252; 709/228
(58) Field of Search ................................ 370/252, 235, 370/237, 238, 432, 254, 255, 351, 400, 401, 229; 709/220, 224, 228, 241, 105, 226

(56) References Cited

U.S. PATENT DOCUMENTS

| | | | | |
|---|---|---|---|---|
| 5,600,794 A | * | 2/1997 | Callon | 709/241 |
| 5,917,820 A | * | 6/1999 | Rekhter | 370/392 |
| 6,052,718 A | * | 4/2000 | Gifford | 709/219 |
| 6,070,191 A | * | 5/2000 | Narendran | 709/226 |
| 6,078,590 A | * | 6/2000 | Farinacci | 370/432 |
| 6,084,858 A | * | 7/2000 | Matthews | 370/238 |
| 6,115,752 A | * | 9/2000 | Chauhan | 709/241 |
| 6,175,869 B1 | * | 1/2001 | Ahuja | 709/226 |
| 6,256,675 B1 | * | 7/2001 | Rabinovich | 709/241 |
| 6,298,381 B1 | * | 10/2001 | Shah | 709/228 |
| 6,487,172 B1 | * | 11/2002 | Zonoun | 370/238 |
| 6,505,254 B1 | * | 1/2003 | Johnson | 709/239 |
| 6,553,413 B1 | * | 4/2003 | Leighton | 709/215 |

FOREIGN PATENT DOCUMENTS

WO    WO 98/26559    6/1998

OTHER PUBLICATIONS

Seshan, S., Stemm, M., and Katz, R.H., "SPAND: Shared Passive Network Performance Discovery," IBM T.J. Watson Research Center, Yorktown Heights, NY, USA.

(List continued on next page.)

Primary Examiner—Douglas Olms
Assistant Examiner—Ricardo M. Pizarro
(74) Attorney, Agent, or Firm—Gunnison, McKay & Hodgson, L.L.P.; Philip J. McKay

(57) ABSTRACT

The invention is a method and apparatus for determining an approximate network distance using one or more reference points. In accordance with an embodiment of the invention, the method comprises the steps of selecting at least one reference point positioned along a path between first and second points of a network, generating first distance metric information associated with at least one path associating a first point and the at least one reference point, generating second distance metric information associated with at least one path associating a second point and the at least one reference point, and determining a total approximate distance between the first point and the second point along one or more paths based on the first and second distance metric information. In one or more embodiments, the second distance metric information is published to one or more servers providing domain name server mapping information and the second distance metric information is provided to the first point along with requested mapping information. In one or more embodiments, total approximate distance information between a client and multiple servers providing a desired service is determined and a server associated with a shortest total approximate distance is selected from which to obtain the service.

18 Claims, 4 Drawing Sheets

OTHER PUBLICATIONS

Moore, K., "SONAR—A Network Proximity Service," Internet Draft, Mar. 4, 1998, Version 1, Internet Engineering Task Force (IETF), Network Working Group, University of Tennessee, Knoxville,TN, USA.

James D. Guyton and Michael F. Schwartz, "Locating Nearby Copies of Replicated Internet Servers," Computer Communications Review, Oct. 1, 1995, pp. 288–298, vol. 25, No. 4, Association for Computing Machinery, New York, USA.

Paul Francis, Sugih Jamin, Vern Paxson, Lixia Zhang, Daniel F. Gryniewicz and Yixin Jin, "An Architecture for a Global Internet Host Distance Estimation Service," Proceedings of the 18$^{th}$ IEEE Infocom '99, Mar. 21–25, 1999, IEEE Press, New York, USA.

* cited by examiner

METHOD AND APPARATUS FOR DETERMINING APPROXIMATE NETWORK DISTANCES USING REFERENCE LOCATIONS

BACKGROUND OF THE INVENTION

1. Field of the Invention

This invention relates to a method and apparatus for determining approximate network distances using one or more network reference locations or points.

2. Background Art

Computer systems sometimes rely on a server computer system to provide information to requesting computers on a network. When there are a large number of requesting computers, it may be necessary to have more than one server computer system to handle the requests. In prior art systems, there is a problem in efficiently directing requests to the correct server in a multiple server system.

One area where this has been a problem is on the Internet. The problem can be better understood by reviewing the structure and operation of the Internet.

The Internet

The Internet is a worldwide network of interconnected computers. An Internet client accesses a computer on the network via an Internet provider. An Internet provider is an organization that provides a client (e.g., an individual or another organization) with access to the Internet (via analog telephone line or Integrated Services Digital Network line, for example). A client can, for example, read information from, download a file from or send an electronic mail message to another computer/client using the Internet.

To retrieve a file or service on the Internet, a client must search for the file or service, make a connection to the computer on which the file or service is stored, and download the file or service. Each of these steps may involve a separate application and access multiple, dissimilar computer systems. The World Wide Web (WWW) was developed to provide a simpler, more uniform means for accessing information on the Internet.

The components of the WWW include browser software, network links, servers, and WWW protocols. The browser software, or browser, is a user-friendly interface (i.e., front-end) that simplifies access to the Internet. A browser allows a client to communicate a request without having to learn a complicated command syntax, for example. A browser typically provides a graphical user interface (GUI) for displaying information and receiving input. Examples of browsers currently available include Mosaic, Netscape Navigator and Communicator, Microsoft Internet Explorer, and Cello.

Information servers maintain the information on the WWW and are capable of processing a client request. The Hypertext Transfer Protocol (HTTP) is the standard protocol for communication with an information server on the WWW. HTTP has communication methods that allow clients to request data from a server and send information to the server.

To submit a request, the client contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request thus consists of establishing a connection between the client and the HTTP server, performing the request, and terminating the connection. The HTTP server does not retain any information about the request after the connection has been terminated. HTTP is, therefore, a stateless protocol. That is, a client can make several requests of an HTTP server, but each individual request is treated independently of any other request. The server has no recollection of any previous request.

An addressing scheme is employed to identify Internet resources (e.g., HTTP server, file or program). Identifiers used in this addressing scheme are called Uniform Resource Locators (URL). A URL may contain one or more of the protocol to use when accessing the server (e.g., HTTP), the Internet domain name of the site on which the server is running, the port number of the server, and the location for the resource in the file system of the server.

The WWW uses a concept known as hypertext. Hypertext provides the ability to create links within a document to move directly to other information. To activate the link, it is only necessary to click on the hypertext link (e.g., a word, phrase or an image). The hypertext link can be information stored on a different site than the one identifying the location for the additional information. When the link is activated, the client's browser uses the link to access the data at the site specified in the URL.

An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environmental variables. The gateway program processes the data and returns its response to the server using CGI (via standard input, for example). The server forwards the data to the client using the HTTP.

Domain Name Server

A computer user navigates the Internet or web from a browser on a computer system. To access a web site, the user enters a URL containing the host name of the web site into the browser. This can be accomplished by clicking on a link, by activating a tool bar button, or by manually entering a name or address into a location field. The URL that is entered is not the actual Internet Protocol (IP) address of the intended web server. The actual IP address is a string of numbers that uniquely locate the web server that provides the web site data. A worldwide distributed database system, called the "Domain Name System" (DNS) provides the mapping between server names and the associated IP addresses.

Client application software, such as a web browser, typically uses a local library, called the "DNS resolver" to obtain the translation from server name to IP address. The resolver in turn contacts a predetermined local DNS server to obtain the translation. DNS servers can maintain caches of previously resolved names. More specifically, name resolution processes typically require two hosts on the client side. Consider a user working on "asha.eng.sun.com" that wants to get the address of "www.uspto.gov". The client browser will communicate with a local resolver (a library attached to the browser process itself, in the current example running on asha.eng.sun.com). The local resolver will go to one of a relatively small number of local name servers, e.g. "ns.xyz.com". Here ns.xyz.com is called the client side name server. The client side name server will communicate with the outside world to determine the IP address of www.uspto.gov, and forward this information to the resolver that is part of the browser process.

DNS comprises a global network of servers that translate host names into Internet Protocol or IP addresses and provides IP addresses to name mapping as well.

Once the IP address is known, the browser communicates with the web server at that address to retrieve the requested web page or other information.

DNS Server Problems

An Internet server is typically limited in the number of clients it can efficiently service at any one time. However, the owner of an Internet site does not want users to be denied access to their Internet site. The Internet site owners desire all attempted accesses to be successful, especially the popular ones.

To provide such service, some companies have implemented systems that allow multiple Internet servers to service requests for a single Internet site. If there are two servers, it would be expected that each server would service approximately half of the client requests to the supported Internet site. This concept is known as "distributed servers", and specifically in this case "distributed Internet servers."

There are a number schemes for implementing the distributed Internet server. The schemes involve the manner in which requests to the Internet site address are routed to the multiple servers. One such scheme is called DNS shuffle address or "round-robin." In this scheme, as each request comes to the Internet site address, the servers that respond are rotated in some order. If there are three servers in the distributed system, then any one of the servers handles approximately every third request. This scheme has a disadvantage of ignoring load balancing considerations and traffic localization considerations.

Another scheme uses a freely available script call "lbnamed" that provides a DNS server with the ability to return a different IP address for every client request received for a Internet site host address. The returned IP address can be made to depend on server load as well as availability of local Internet servers, but ignores the relative distance between clients and the available servers.

Another known approach is called "smart clients." The smart client approach is an architecture for web traffic client-server communication that allows for a dynamic server choice based on load and availability. The approach allows for the user of multiple server machines to achieve scalable performance for load balancing, for fault transparency, and backwards compatibility with the existing addressing scheme (URLs). The architecture requires client web browsers to execute downloadable, server specific code. This code is divided into a GUI thread and director thread. Server choice, load balancing, and fault transparency are encapsulated by the director thread. A disadvantage of this scheme is that it requires cooperation of requesting clients. It imposes extensive overhead on single web page retrieval and traversal to new sites.

Another scheme which has been proposed is called SONAR. SONAR is a service arranged to provide information to an application which the application can use to make a good choice about which of a variety of resources to access or utilize. The SONAR service does not specify use of any particular means of estimating network proximity. Instead, the SONAR service assumes that the best means of estimating network proximity will change over time and from network to network. In addition, information provided by one SONAR service server though not be compared to the information provided by another server, since different SONAR servers providing the service information may employ different proximity information.

SUMMARY OF THE INVENTION

The invention is a method and apparatus for determining the approximate distance between a first point and a second point of a network using one or more reference points.

In accordance with one embodiment of the invention, the method comprises the steps of selecting at least one reference point frome nodes of the network, obtaining first distance metric information associated with at least one path associating the first point and the at least one reference point, obtaining second distance metric information associated with at least one path associating the second point and the at least one reference point, and determining a total approximate distance for at least one path associating the first point and the second point based on the first and second distance metric information.

In accordance with one embodiment of the method the first point comprises a client, each second point comprises a server, and the one or more reference points comprise other nodes of the network.

In one or more embodiments, the second distance metric information is published to one or more servers providing domain name mapping information and the second distance metric information is provided to the client (or second point) along with requested domain name mapping information.

In accordance with one embodiment of the invention, sets of total approximate distance information are generated which are associated with network distances between a client and at least two servers, and an optimal server is identified by ranking the sets of generated total distance information.

In one or more embodiments, computer hardware and/or software is arranged to perform the method of the invention.

Further objects, features and advantages of the invention will become apparent from the detailed description of the drawings which follows, when considered with the attached figures.

DETAILED DESCRIPTION OF THE INVENTION

Figure 1:
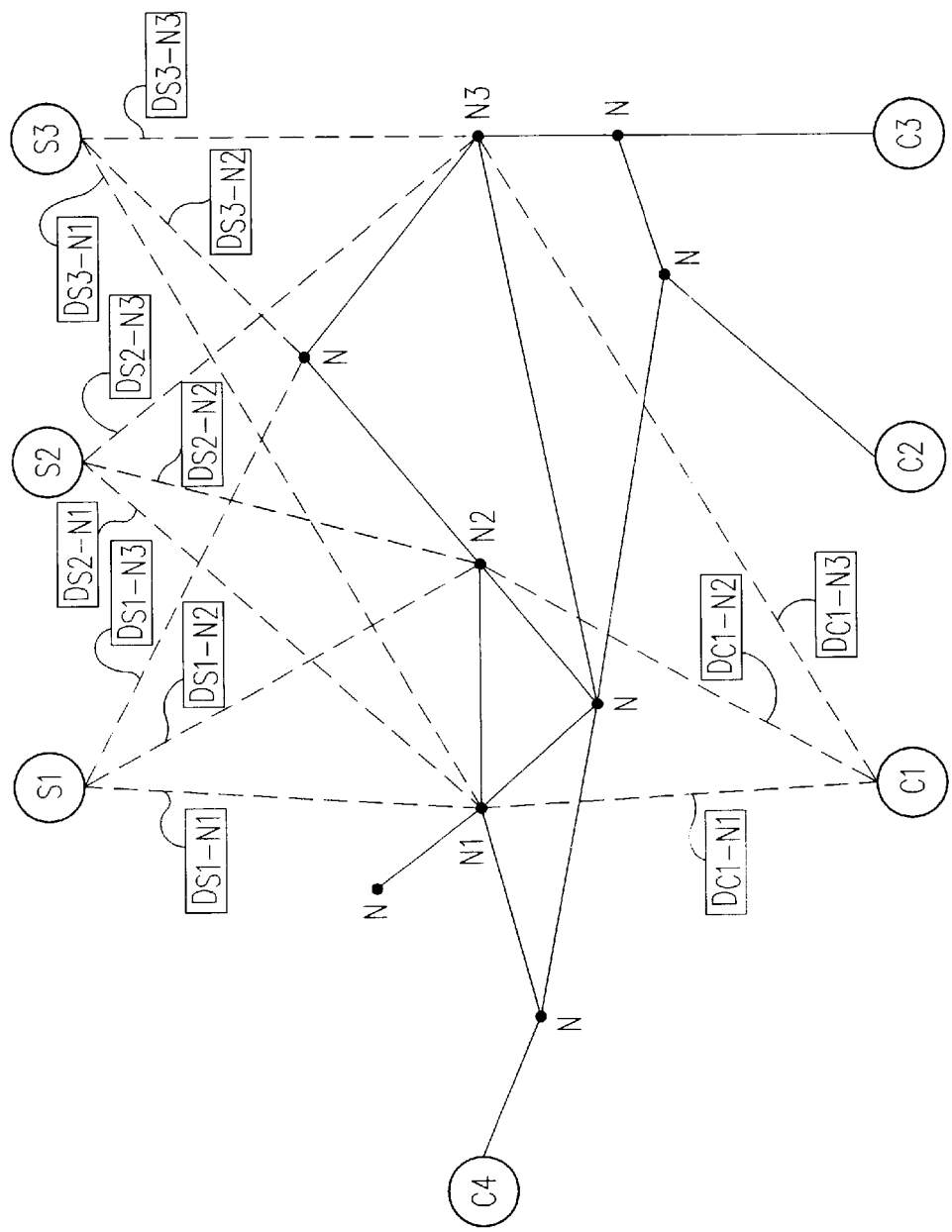
FIG. 1 is a diagram of a network comprising a variety of nodes N intermediate several servers S1–S3 and clients C1–C4.

The invention is a method and apparatus for determining approximate network distances using reference points. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, and Java are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

Method for Determining Approximate Network Distances

One or more embodiments of the invention comprise a method for determining approximate distance information associated with a network using one or more reference locations. In one or more embodiments, the method may be utilized to determine distance information associated with a distance from a client to one or more servers offering a particular application or data which the client desires.

As used herein, the term "distance" is intended to mean more than geographic distance, such as one or more of a variety of metrics or variables affecting transfer or movement of information over the network, such as those metrics or variables affecting the ability of the client to obtain or access desired information, applications or data. These metrics may include, but are not limited to, the geographic distance in three-dimensional space, the number of hops between two points, delay, bandwidth, link speed, server capacity, congestion tendency and server operation quality. The terms "to" "from" and "between" as they relate to "distance" are generally meant to refer to the one or more above-described metrics or variables, and are not intended to imply direction or that factors associated with the end points are not to be considered. The term "between" also includes arrangements where element(s) are not geographically between intermediate other elements. It should be understood that a first point may be "between" two points in that it lies along a path through a network, although the point may not be geographically between the other points. The terms "between," "associated with," "associating" and similar terms as used herein (ex. the distance between the client and server or of a path associating two points) generally include factors associated with the end points. As described in more detail below, "distance" may be determined by a selection of one or more than one metric. In one or more embodiments, "distance" may be determined as a composite function of several metrics. In such a function, one or more metrics may be given different weighting factors.

The term "approximate distance" is used herein since generally the generated distance information is not true or exact. It should be appreciated, however, that in one or more instances the generated distance information may comprise exact distance information.

An embodiment of the method of the invention will be described with reference to FIG. 1. As illustrated therein, a network includes one or more nodes N. One or more clients C are associated with the network. The clients C may be directly or indirectly connected to one or more nodes N of the network, or the clients C may selectively connect to one or more nodes N of the network. For example, the client C may comprise a computer which is hardwired to another portion of the network, or may connect to the network with a computer via a telephone line, Integrated Services Digital Network line, or wireless connection. By the term client, it is meant some device, entity or element which is capable of seeking information, data or elements from a source remote therefrom.

One or more servers S are also associated with the network. The servers S may be connected directly or indirectly (such as through one or more other nodes) to one or more nodes N of the network. Like a client C, a server S may be connected to the network by hardwiring, telephone line, a wireless connection, or the like, as is well known to those of skill in the art. By server S it is meant some device, entity or thing which is capable of providing information, data or elements upon request or prompt.

The nodes N may be connected in a variety of manners, such as hardwiring. A node N may comprise a router, switch or the like.

The term network as used herein is intended to include the Internet, as described in detail above, wide or local area networks (WANs or LANs) or any other arrangement where at least two elements are connected to or in communication with one another. While the invention is described with specific reference to the determination distance information associated with the network distance between a client C and server S, the invention may be used to determine distance information associated with a distance between a variety of points on or associated with the network.

In one embodiment of the invention, the method may be used to determine the approximate "distance" between a first point such as a client C and one or more second points such as servers S. This method will be described in detail with reference first to FIG. 2. As indicated therein, in a first step S20 one or more nodes N associated with the network are selected. The nodes may be selected based on a variety of criteria. In accordance with one embodiment of the invention, a set of nodes N are selected which represent a set of nodes through which a substantial amount of all routed traffic or information flows. Of course, the selected set of nodes N may change over time dependent on changes in the network and the routing of traffic or information therethrough. As described in detail below, though these selected nodes N may comprise nodes used for determining approximate distance information, it is not necessary for information/requests and other data to actually be routed through those nodes. In general, the selected nodes N are simply selected as reference points in the network for use in an approximate distance determination.

In the embodiment illustrated in FIG. 1, nodes N1, N2 and N3 represent the set of selected nodes N.

In a step S22, distance metric information associated with the network distance between the server(s) and node(s) and client and node(s) is obtained. Referring to FIG. 2(a), in one or more embodiments, this step S22 includes the step S24 of determining or generating the distance from one or more servers S to one or all of the nodes of the selected node set. In one or more embodiments of the invention, this distance is determined by generating distance metric information or data associated with each server S offering a desired service and one or more paths from the server S through the network to the selected node(s). A variety of apparatus and methods well known in the art are contemplated for use in determining this distance.

In the embodiment illustrated in FIG. 1, the result of this step S24 is the generation of distance metric information associated with the network distance between server S1 and each of nodes N1, N2 and N3; distance information associated with the network distance between server S2 and each of nodes N1, N2 and N3; and distance metric information associated with the distance between server S3 and each of nodes N1, N2 and N3. (i.e. distance metrics are determined associated with a path having end points of a server (S1, S2 etc.) and a node (N1, N2 etc.)).

In one or more embodiments, the distance information which is generated comprises information regarding the approximate distance between each server S and each node N along each possible path, both forward and reverse. For example, distance information associated with server Si and node N1 may include DS1-N1 (direct path, forward), DS1-N2-N1 (path through node N2) and DN1-S1 (direct path, reverse direction). It is desirable to provide distance information for each path in both directions, as such distances may be asymmetric.

For simplicity, in many instances herein a path is described as passing through a single node. It is desirable, however, to consider/select paths that may pass through a large number of nodes (whether considering server-to-node or client-to-node distances). It may be that a path leading from a server to a selected node that passes through ten (10) intervening nodes is "shorter" when considering the specific distance criteria desired, than a path that passes through only six (6) intervening nodes. As such, it is desirable to consider variation in paths through nodes arriving or starting at the selected nodes.

In a step S25, the information determined in step S24 is transmitted to or obtained by the client. In one embodiment, the information which is generated in step S24 is "published" to one or more locations for access by one or more clients C. In one or more embodiments, the server-to-node distance information is published to one or more DNS servers. In this manner, when the client C requests access to a particular location or site, a DNS server provides translated domain name or "mapping" information (as described in the Background of the Invention section of the application, above). Simultaneously, the server-to-node information is provided with this DNS mapping information. In this arrangement, the server-to-node distance information for the distance between many servers and nodes may be published to DNS servers for availability to clients. In one or more embodiments, the server-to-node distance information may be provided in a variety of other arrangements. For example, the server-to-node distance information may be directly transmitted to a client C upon specific request. This information may be provided over a dedicated or separate line.

Referring still to FIG. 2(a) in a step S26, the distance between a particular client C and one or more nodes of the selected node set is determined. (i.e. a distance is determined which is associated with a path having end points of a client C and one or more nodes.) Again, this distance is represented by generated distance metric information or data for one or more paths between the client C and the one or more selected nodes. As above, a variety of apparatus and methods are contemplated for use in determining this distance information.

When applied to the arrangement illustrated in FIG. 1, the result of this step S26 is the generation of distance metric information associated with the network distance between client C1 and each of nodes N1, N2 and N3. As provided above, in one or more embodiments, the distance information provided includes distance information for each possible path, both in the forward and reverse directions.

The distance information which is generated in steps S24 and S26 may be generated in parallel, or at separate times. For example, as described in more detail below, server-to-node distance information may be generated continuously and published on the network. A client C may generate client-to-node information only when necessary. On the other hand, both sets of information may be developed at the same time.

In the arrangement, where the server-to-node information is published with DNS information, the client-to-node and server-to-node distance information can be provided or determined in parallel, shortening the time necessary for obtaining this information. In addition, in the above-described arrangement, the client C does not need to find the service which calculates the server-to-node distance information. A variety of services which calculate these distances instead publish the distance information to regularly accessed DNS servers and then provide it with other information which must be transmitted to the client C.

Referring again to FIG. 2, in step S22, in one or more embodiments, the client C may obtain the information generated in steps 24 and 26. For example, the client C may have generated the distance information in step S26 and the information generated in step S24 may be sent to the client C. In one or more embodiments, the information generated in steps S24 and S26 is obtained by a fourth party, such as an independent entity apart from the client C.

Figure 2:
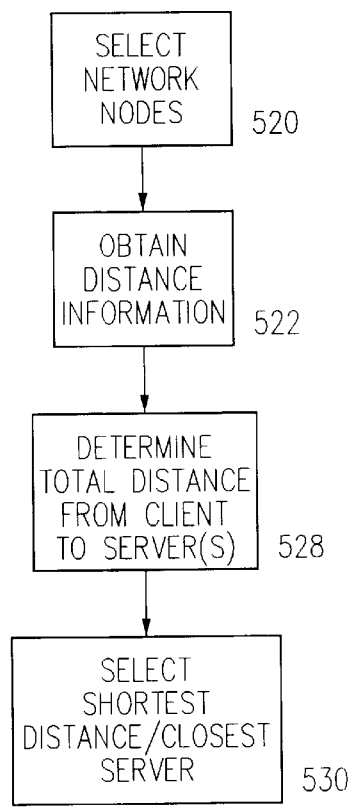
FIG. 2 is a flowchart illustrating one embodiment of a method of the invention.
Figure 2A:
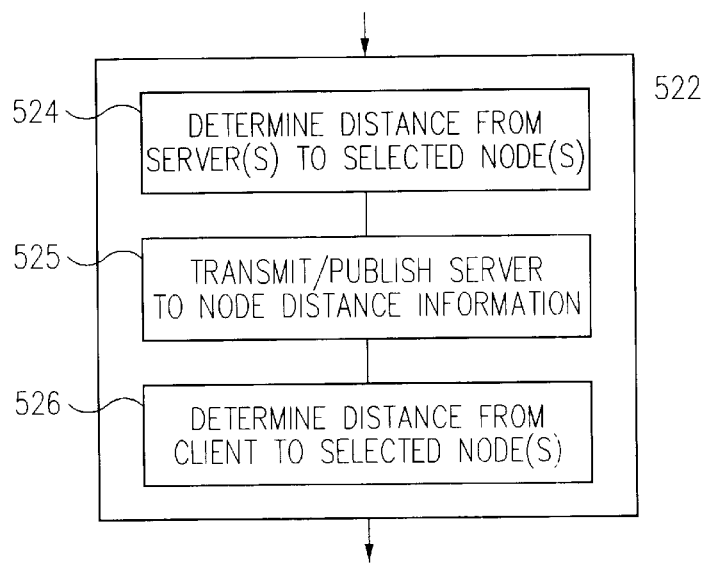
FIG. 2(a) is a flowchart illustrating in greater detail one embodiment of steps for accomplishing a step of the method illustrated in FIG. 2.

Still referring to FIG. 2, after the distance information is obtained in a step S28, the total approximate distance from the client C to each server S (or one or more of servers S providing a desired service) is determined. This may be accomplished in a number of ways. First, when like distance metric information is generated corresponding to the server-to-node and client-to-node distances (which as stated above may comprise data for a number of different paths), the information may be summed. For example, if the distance metric information associated with the server to node distance was "distance is 10 hops" and the distance metric information associated with the client to node distance as "distance is 6 hops," then the upper bound on the total distance may be represented by the summed distance metric information, or at most "16 hops."

In other embodiments, the total distance may comprise weighted averages, multiplied values, a minimum or maximum value, or any other scheme desired for generating total distance information from the individual distance information.

Referring to FIG. 2, an upper bound for the total distance from client C1 to server S1 through the various nodes N1–N3 may be determined. For example, this information may comprise use of the DS1-N1 and DC1-N1 distance information for a node N1 path, DS1-N2 and DC1-N2 for a node N2 path, and the like.

Once the total distance from the client C to each server S via each of what may be a numbers of path options is determined, the distance information may be evaluated based on a variety of criteria. For example, the distances may be "ranked." As one example, in a step S30, the client C selects or accesses the server S associated with the shortest or optimal total distance determined in step S28.

Again, a wide variety of criteria may be used to rank or otherwise manipulate the total distance information. In the above-reference example, the method provides a client with information regarding which server among a group of servers provides a desired service most effectively. Of course, a client may decide what factors or metrics associated with the total distance information yield this server choice. For example, a client may decide that the server which is accessible with the least number of hops is the server to choose, while another client may decide that the server of choice is that which is located closest geographically. The choice may be based on weighting the total distance information or the like as well.

Once provided with the total distance information and having selected a server, the client may request information, data or the like from that server through the network.

As one aspect of the invention, it is not necessary for the client C to amass all of the distance information and make the determination of the shortest distance. For example, the distance information may be sent to a fourth party and that fourth party may determine and prioritize the distances. This fourth party may then inform the client C of the server which should be selected.

It is also noted that in the distance computation, cooperation of the many selected nodes N may occur, but is not necessary.

In one embodiment, the information or data which is ultimately routed to and from the selected server is arranged to pass through the one or more nodes which were used as the reference nodes for the distance calculation. In one or more other embodiments, the routing information is generated apart from the distance information and the path of information routed to and from the server passes through the network unrestricted by the selection of particular nodes for which the distance calculation was based. For example, the transmitted information may be routed along a different path where the distance was calculated based on server bandwidth, etc.

The method of the invention is useful in providing information which permits a client to choose the most or at least a more efficiently obtainable resource, such as a server. At the same time, this may be accomplished without the client's involvement (meaning that the operator of a computer or the like does not need to take any specific action, but that the method may be implemented "hidden from" the actual user).

Embodiment of Computer Execution Environment (Hardware)

Figure 3:
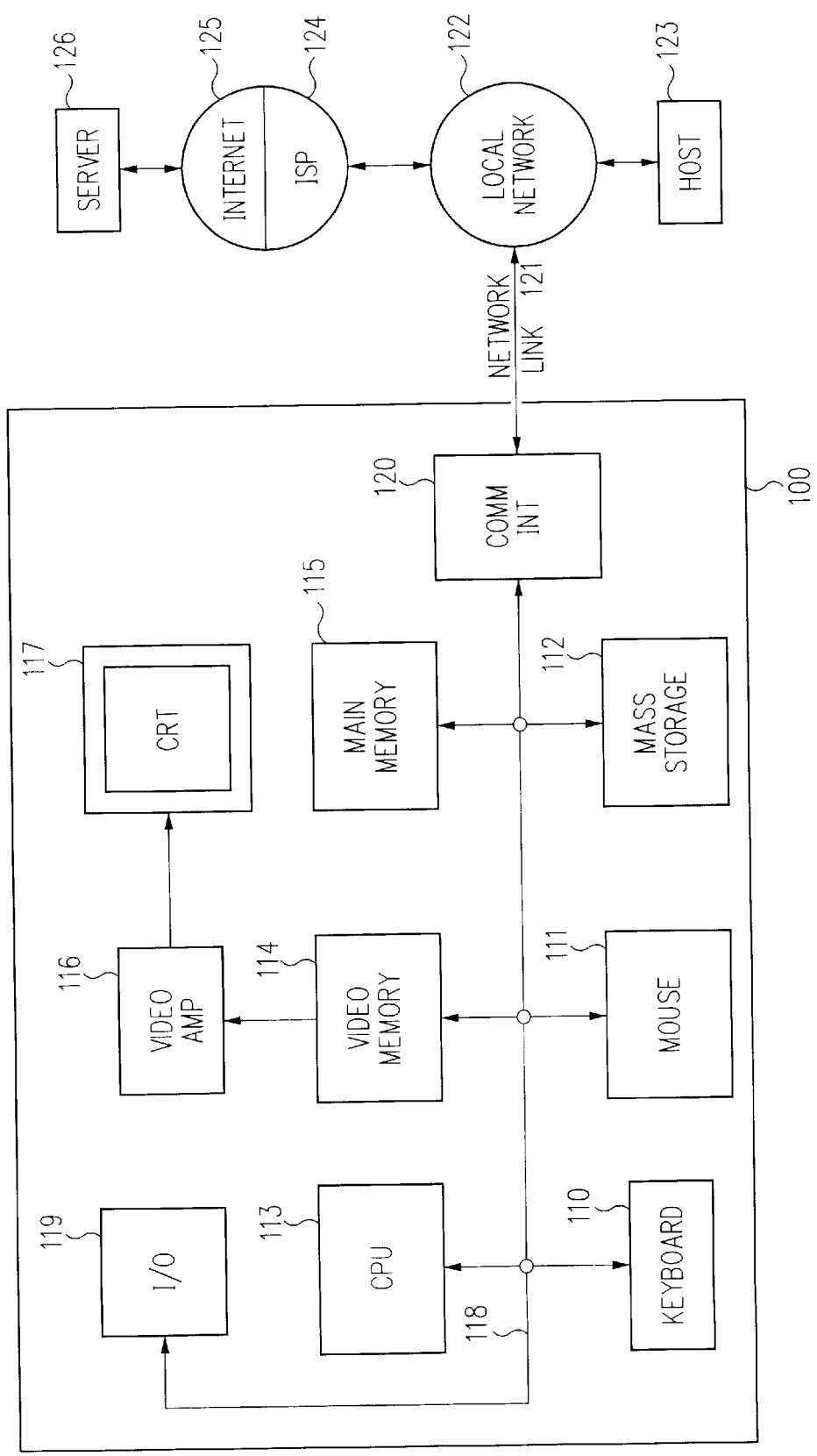
FIG. 3 is a block diagram of one embodiment of a computer system capable of providing a suitable execution environment for an embodiment of the invention.

An embodiment of the invention can be implemented as computer software in the form of computer readable code executed on a general purpose computer such as computer 100 illustrated in FIG. 3, or in the form of bytecode class files executable within a runtime environment (such as, e.g., a Java™ runtime environment) running on such a computer, or in the form of bytecodes running on a processor (or devices enabled to process bytecodes) existing in a distributed environment (e.g., one or more processors on a network). A keyboard 110 and mouse 111 are coupled to a system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to system bus 118 represents such I/O elements as a printer, A/V (audio/video) I/O, etc.

Computer 100 includes a video memory 114, main memory 115 and mass storage 112, all coupled to system bus 118 along with keyboard 110, mouse 111 and processor 113.

The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 64-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Sun Microsystems, Inc., such as the SPARC>> microprocessor, or a microprocessor manufactured by Motorola, such as the 680X0 processor, or a microprocessor manufactured by Intel, such as the 80X86, or Pentium processor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Figure 4:
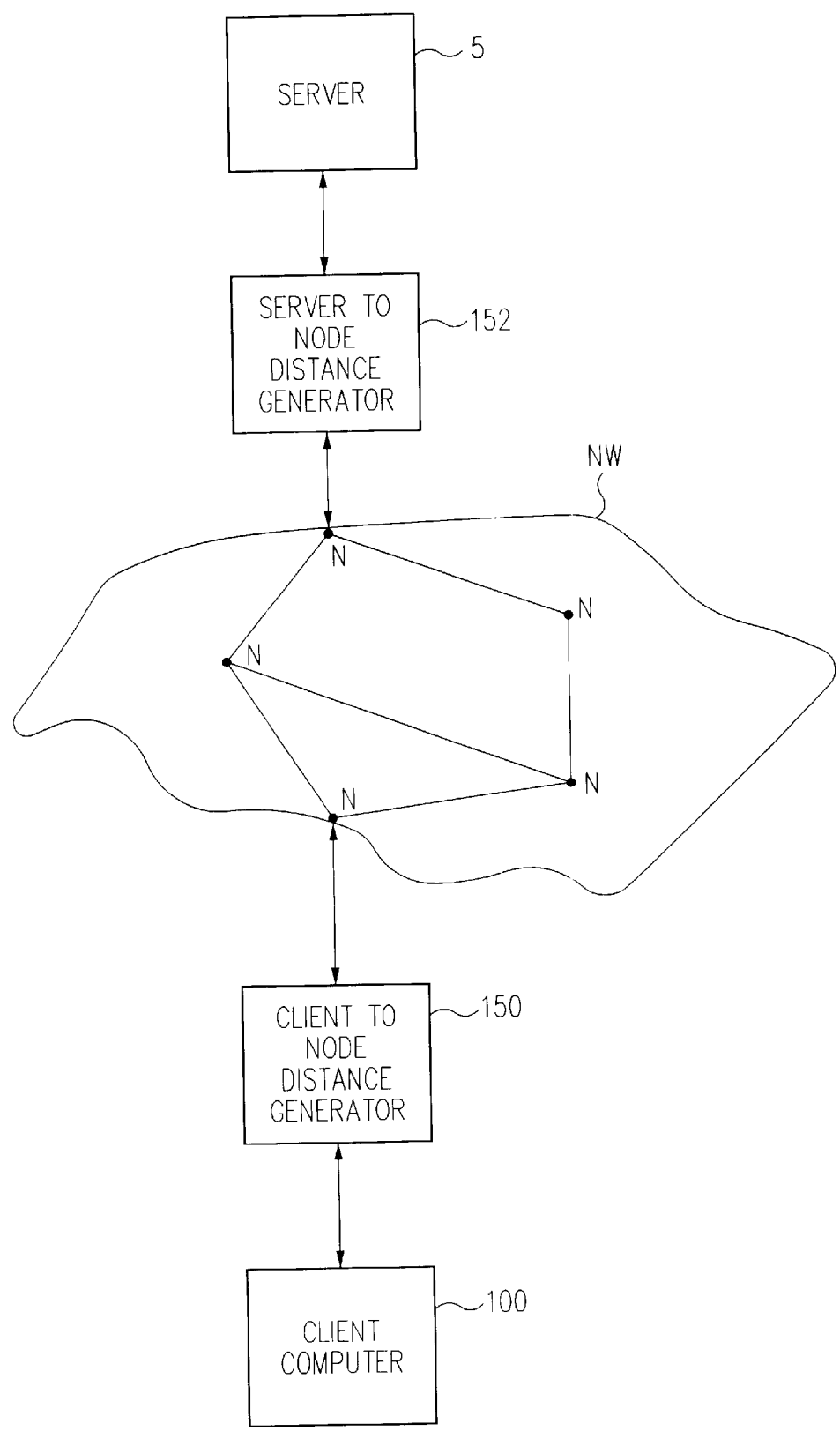
FIG. 4 is a block diagram of illustrating an embodiment of the invention where distance generators are associated with a client and a server of a network.

FIG. 4 illustrates an arrangement wherein a client computer 100 is connected to a server S through a network NW comprising one or more nodes N. In an embodiment of the invention, a client-to-node distance generator 150 is associated with the client's computer 100. The client-to-node distance generator 150 is arranged to generate client computer 100 to node N distance data, as in step S24 of the method illustrated in FIG. 2.

A server-to-node distance generator 152 is associated with the server S. The server-to-node distance generator 152 is arranged to generate server S to node N distance data, as in step S22 of the method illustrated in FIG. 2.

The client computer 100 may be arranged to compile the distance information generated by the client to node distance generator 150 and server to node distance generator 152, as in steps 28 and 30 of the method illustrated in FIG. 2.

The client-to-node and server-to-node distance generators 150,152 may comprise software or hardware located at the client computer 100 or server S, respectively, or may comprise a remote "service" which provides and/or communicates the distance information to the client computer 100.

In this arrangement, before the client requests a particular application service, the client computer 100 calculates which server S to use by obtaining information from the client-to-node distance generator 150 and the server-to-node distance generators 152.

As will be appreciated by those of skill in the art, there is a wide variety of configurations for hardware and software for accomplishing the method of the invention other than that described above.

The foregoing description is that of example embodiments of the invention, and various changes and modifications may be made without departing from the spirit and scope of the invention, as defined by the claims.

What is claimed is:

1. A method of determining an approximate network distance between a first point and a second point of a network having one or more nodes, comprising:
    selecting at least one reference point from said nodes of said network;
    obtaining first distance metric information associated with at least one path associating a first point and said at least one reference point;
    obtaining second distance metric information associated with at least one path associating a second point and said at least one reference point; and
    determining a total approximate distance associated with at least one path associating said first point and said second point based on said first and second distance metric information said network further comprising:
    at least one third point of said network; and
    obtaining a third distance metric information associated with said at least one path associating said at least one third point and said at least one reference point network distance and determining a second total approximate distance associated with a path associating said first point and said third point.

2. The method in accordance with claim 1 wherein said second and said at least one third point comprises a server and said first point comprises a client.

3. The method in accordance with claim 1 including the step of transmitting said second distance metric information to said first point.

4. A method of determining an approximate network distance between a first point and a second point of a network having one or more nodes, comprising:
    selecting at least one reference point from said nodes of said network;
    obtaining first distance metric information associated with at least one path associating a first point and said at least one reference point;
    obtaining second distance metric information associated with at least one path associating a second point and said at least one reference point; and
    determining a total approximate distance associated with at least one path associating said first point and said second point based on said first and second distance metric information,
    wherein there are at least two second points, said method further comprising:
        obtaining second distance metric information associated with said at least one path associating each second point and said at least one reference point, determining a total approximate distance associated with said at least one path associating said first point and each second point based on said first and second distance metric information, and including selecting a closest second point by selecting a path to a second point having a shortest total approximate distance.

5. The method in accordance with claim 4 wherein said shortest total approximate distance is selected from a group consisting of one or more of: a total approximate distance having a shortest number of hops, a shortest delay, a maximum bandwidth and a maximum reliability.

6. The method in accordance with claim 4 wherein said network comprises the Internet.

7. The method in accordance with claim 4 wherein said providing said second distance metric information comprises transmitting said second distance metric information with mapping information.

8. The method in accordance with claim 7 further comprising publishing said second distance metric information to a server providing DNS mapping information.

9. A method of determining an approximate network distance between a first point and a second point of a network having one or more nodes, comprising:
    selecting at least one reference point from said nodes of said network;
    obtaining first distance metric information associated with at least one path associating a first point and said at least one reference point;
    obtaining second distance metric information associated with at least one path associating a second point and said at least one reference point; and
    determining a total approximate distance associated with at least one path associating said first point and said second point based on said first and second distance metric information;

wherein said first distance metric information comprises at least one first and at least one second metric, and including the step of obtaining a first distance from said at least one first and second metric information.

10. The method in accordance with claim 9 wherein said obtaining said first distance comprises manipulating said at least one first and second metric information with a composite metric function in which one or more of said metrics are given greater weight than another.

11. A method of determining an approximate network distance between a first point and a second point of a network having one or more nodes, comprising:

selecting at least one reference point from said nodes of said network;

obtaining first distance metric information associated with at least one path associating a first point and said at least one reference point;

obtaining second distance metric information associated with at least one path associating a second point and said at least one reference point; and determining a total approximate distance associated with at least one path associating said first point and said second point based on said first and second distance metric information;

wherein said second distance metric information comprises at least one first and at least one second metric, and including obtaining a second distance from said at least one first and second metric information.

12. The method in accordance with claim 11 wherein said obtaining said second distance comprises manipulating said at least one first and second metric information with a composite metric function in which one or more of said metrics are given greater weight than another.

13. A computer program product comprising:

a computer usable medium having computer readable program code embodied therein for determining an approximate distance between two points on a network, said medium comprising:

computer readable program code configured to cause a computer to select at least one reference point of said network;

computer readable program code configured to cause a computer to obtain first distance metric information associated with said at least one path associating said first point and said at least one reference point;

computer readable program code configured to cause a computer to obtain second distance metric information associated with at least one path associating said second point and said at least one reference point; and computer readable program code configured to cause a computer to determine a first set of total approximate distance information for paths associating said first point and said second point based on said first and second distance metric information.

14. The computer program product in accordance with claim 13 wherein said computer readable program code is configured to obtain third distance metric information associated with at least one path associating said at least one third point and said at least one reference point.

15. The computer program product in accordance with claim 14 wherein said computer readable program code is further configured to determine second total approximate distance information for paths associating said first point and said at least one third point based on said first and third distance metric information.

16. The computer program product in accordance with claim 15 wherein said computer readable program code is further configured to select a point from a group of said second and at least one third point, said selected point associated with a shortest total approximate distance from said first and second total distance information.

17. The computer program product in accordance with claim 15 wherein said computer readable program code is configured to cause a computer to obtain first distance metric information with a composite function using at least two different distance information metrics.

18. The computer program product in accordance with claim 15 wherein said computer readable program code is configured to cause a computer to obtain said second distance metric information with a composite function using at least two different distance information metrics.

* * * * *